US010090962B2

(12) United States Patent
Jia et al.

(10) Patent No.: US 10,090,962 B2
(45) Date of Patent: Oct. 2, 2018

(54) IN-BAND SIGNALING FOR RECONFIGURING SOFTWARE DEFINED OPTICS

(71) Applicant: ZTE Corporation, Shenzhen (CN)

(72) Inventors: Zhensheng Jia, Morganville, NJ (US); Yi Cai, Jackson, NJ (US); Hung-Chang Chien, Bridgewater, NJ (US); Jianjun Yu, Basking Ridge, NJ (US)

(73) Assignee: ZTE Corporation, Shenzhen (CN)

( * ) Notice: Subject to any disclaimer, the term of this patent is extended or adjusted under 35 U.S.C. 154(b) by 62 days.

(21) Appl. No.: 14/501,887

(22) Filed: Sep. 30, 2014

(65) Prior Publication Data

US 2015/0093118 A1 Apr. 2, 2015

Related U.S. Application Data

(60) Provisional application No. 61/885,429, filed on Oct. 1, 2013.

(51) Int. Cl.
*H04B 10/00* (2013.01)
*H04B 10/04* (2006.01)
*H04J 14/06* (2006.01)
*H04B 10/077* (2013.01)
*H04B 10/516* (2013.01)
*H04B 10/532* (2013.01)

(52) U.S. Cl.
CPC .......... *H04J 14/06* (2013.01); *H04B 10/0779* (2013.01); *H04B 10/5161* (2013.01); *H04B 10/532* (2013.01); *H04B 2210/072* (2013.01)

(58) Field of Classification Search
None
See application file for complete search history.

(56) References Cited

U.S. PATENT DOCUMENTS

| 8,811,169 | B2 * | 8/2014 | Suzuki | H04L 1/0002 370/230 |
| 9,374,166 | B2 * | 6/2016 | Mateosky | H04B 10/07953 |
| 2001/0028678 | A1 * | 10/2001 | Kato | H04B 3/54 375/222 |
| 2002/0122395 | A1 * | 9/2002 | Bourlas | H04L 47/14 370/329 |
| 2008/0049597 | A1 * | 2/2008 | Walker | H04L 1/00 370/204 |

(Continued)

FOREIGN PATENT DOCUMENTS

JP 2006086626 A * 3/2006

*Primary Examiner* — Ken N Vanderpuye
*Assistant Examiner* — Jai Lee
(74) *Attorney, Agent, or Firm* — Perkins Coie LLP

(57) ABSTRACT

In an optical communication system, an optical transmitter changes operational physical layer parameters to meet future target throughput for the optical communication system. The optical transmitter communicates the upcoming change to the optical receiver in a message that used current physical layer parameters. The optical transmitter provides sufficient time to the optical receiver to adjust reception functions of the receiver, including polarization based demodulation scheme. In some implementations, the optical transmitter performs the transition to a new physical layer transmission format without waiting for an acknowledgement from the optical receiver.

19 Claims, 12 Drawing Sheets

(56) References Cited

U.S. PATENT DOCUMENTS

| | | | |
|---|---|---|---|
| 2008/0151989 A1* | 6/2008 | Von Elbwart | H04L 25/0226 |
| | | | 375/239 |
| 2008/0226294 A1* | 9/2008 | Sakai | H04L 1/0041 |
| | | | 398/63 |
| 2009/0196602 A1* | 8/2009 | Saunders | H04B 10/5053 |
| | | | 398/26 |
| 2010/0316379 A1* | 12/2010 | Suvakovic | H04J 3/1694 |
| | | | 398/58 |
| 2012/0257897 A1* | 10/2012 | Hu | H04B 10/548 |
| | | | 398/76 |
| 2013/0058642 A1* | 3/2013 | Bouda | H04B 10/278 |
| | | | 398/25 |
| 2013/0209091 A1* | 8/2013 | Mateosky | H04B 10/07953 |
| | | | 398/26 |
| 2013/0272698 A1* | 10/2013 | Jin | H04L 27/2628 |
| | | | 398/43 |
| 2014/0178071 A1* | 6/2014 | Zhang | H04B 10/5561 |
| | | | 398/65 |
| 2014/0193161 A1* | 7/2014 | In De Betou | H04Q 11/00 |
| | | | 398/154 |
| 2017/0195087 A1* | 7/2017 | Reina | H04L 1/1854 |

* cited by examiner

US 10,090,962 B2

IN-BAND SIGNALING FOR RECONFIGURING SOFTWARE DEFINED OPTICS

CROSS-REFERENCE TO RELATED APPLICATIONS

This patent document claims the benefit of priority of U.S. Provisional Patent Application No. 61/885,429, filed Oct. 1, 2013. The entire content of the before-mentioned patent application is incorporated by reference herein.

BACKGROUND

This application relates to optical communication techniques, devices and systems.

With the advent of transmission of multimedia content such as video over the Internet and other communications networks, there is a growing appetite for increased data rate capacity on communication networks. For example, in optical networks for backbones of communications networks, the traffic at the edges of the networks can aggregate to several gigabits of network traffic or higher, which can be difficult to handle by some existing optical network deployments. One way to meet increasing needs of optical communications network data capacity is to expand the optical fiber network infrastructure. However, laying down optical transmission media such as fiber links and associated fiber optical modules and subsystems requires significant capital expenditure and may not always be a suitable option due to the expenses involved, deployment limitations and certain regulatory issues.

SUMMARY

Techniques for in-band communication between an optical transmitter and an optical receiver are disclosed. In one aspect, prior to changing the physical layer operational parameters, the optical transmitter transmits an in-band message to the optical receiver. The optical receiver can receive the in-band message and adjusts its optical reception functions according to the in-band message. In another aspect, an optical transmitter may be programmed to change network throughput as a function of time, e.g., time of day, so that the optical transmitter may adjust the transmission format to increase or decrease number of bits transmitted per Hertz to meet the target throughput at all times.

In one aspect, a disclosed method of operating an optical transmitter includes transmitting a first information payload using a first physical layer profile (e.g., the modulation format, a spectral efficiency, a forward-error correction (FEC) coding rate, the amount of pre-chromatic dispersion and pre-equalization, or number of optical subcarriers, initiating, at least a transition time prior to a switch time, a transition from the first physical layer profile to a second physical layer profile, wherein the transition time is sufficient to allow changing of an optical polarization demultiplexing scheme at a receiver side, and switching, after the switch time, to the second physical layer profile by transmitting a second information payload using the second physical layer profile.

In another aspect, an optical transmitter includes a determination module that determines, at a current time, that a currently used transmission scheme will not meet a target throughput value for the optical communication network at a future time, an announcement module that announces a change in an impending change in the currently used transmission scheme in a message sent over the communication network using the currently used transmission scheme, wherein the change is announced at a time sufficiently prior to the future time to allow a change to an optical polarization demultiplexing scheme at a receiver side, and a transmission module that continues, after the future time, transmissions in the optical communication network using a new transmission scheme that is different from the currently used transmission scheme.

In yet another aspect, a method implemented by an optical receiver operable in an optical communication network is disclosed. The method includes receiving a first information payload using a first physical layer profile, receiving, at least a transition time prior to a switch time, an indication of transition from the first physical layer profile to a second physical layer profile and preparing for, prior to the switch time, receiving transmissions that use the second physical layer profile.

In yet another aspect, an optical receiver is disclosed. The optical receiver includes a module that receives a first information payload using a first physical layer profile, a module that receives, at least a transition time prior to a switch time, an indication of transition from the first physical layer profile to a second physical layer profile and a module that prepares for, prior to the switch time, receiving transmissions that use the second physical layer profile.

These, and other, features are disclosed in the present document, including Appendix A, which forms an integral part of the present description.

DETAILED DESCRIPTION

Optical transmission equipment typically has a non-time variant performance based on the optical components that are selected. Once optical channels are initially provisioned, their performance and transmission characteristics are static and only dependent on the specific transponder interface. With the introduction of digital signal processing (DSP) in implementations of coherent optical transponders, it is now possible to design flexible hardware that supports optimal channel connections to realize the tradeoffs between physical parameters such as optical reach, spectral efficiency, and modulation format with the application layer bandwidth demand under software control. This concept enables the optical networks to be more dynamic, where channels are configured on demand and might remain configured for only a relatively short duration (e.g., 2 to 5 hours or 1 day).

This flexibility in optical communication could be realized via software-defined optics (SDO), where a common hardware platform for transmission or reception is under software-controlled functional configurations.

The usefulness of such SDO subsystem can range from new applications, to resilience, and to the reduction of operation costs by save sparing, simply network planning, and full use of the available optical signal to noise ratio (OSNR) margin. It shows great market potential for future dynamic optical networking.

Figure 11:
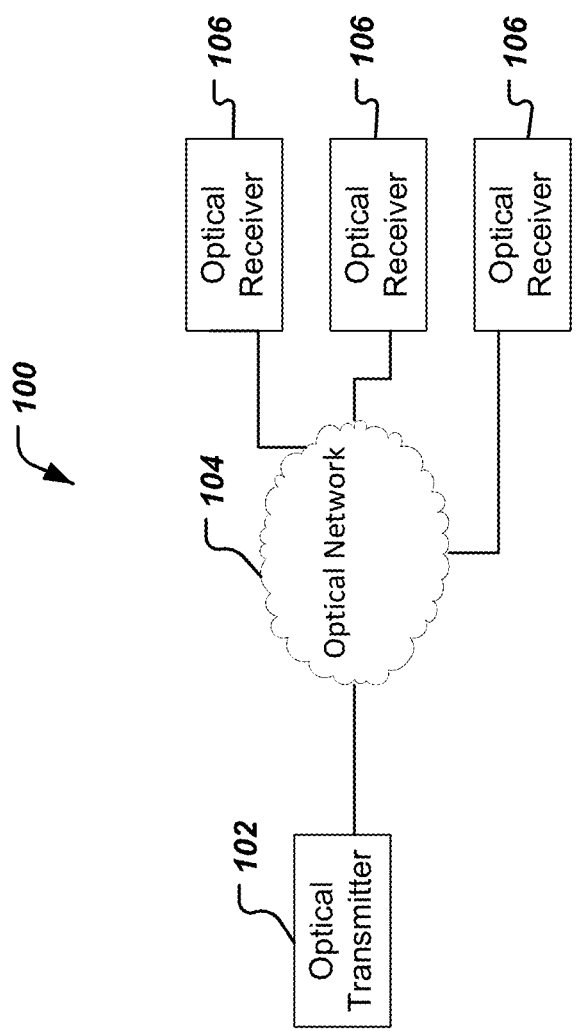
FIG. 11 depicts an example optical communication system.

FIG. 11 is a block diagram for an example of an optical communication system 100 where the subject technology of this document can be implemented. An optical transmitter 102 transmits optical signals through an optical network 104 to one or more optical transceivers 106. The transmitted optical signals may go through intermediate optical equipment such as amplifiers, repeaters, switch, etc., which are not shown in FIG. 11 for clarity.

Figure 1:
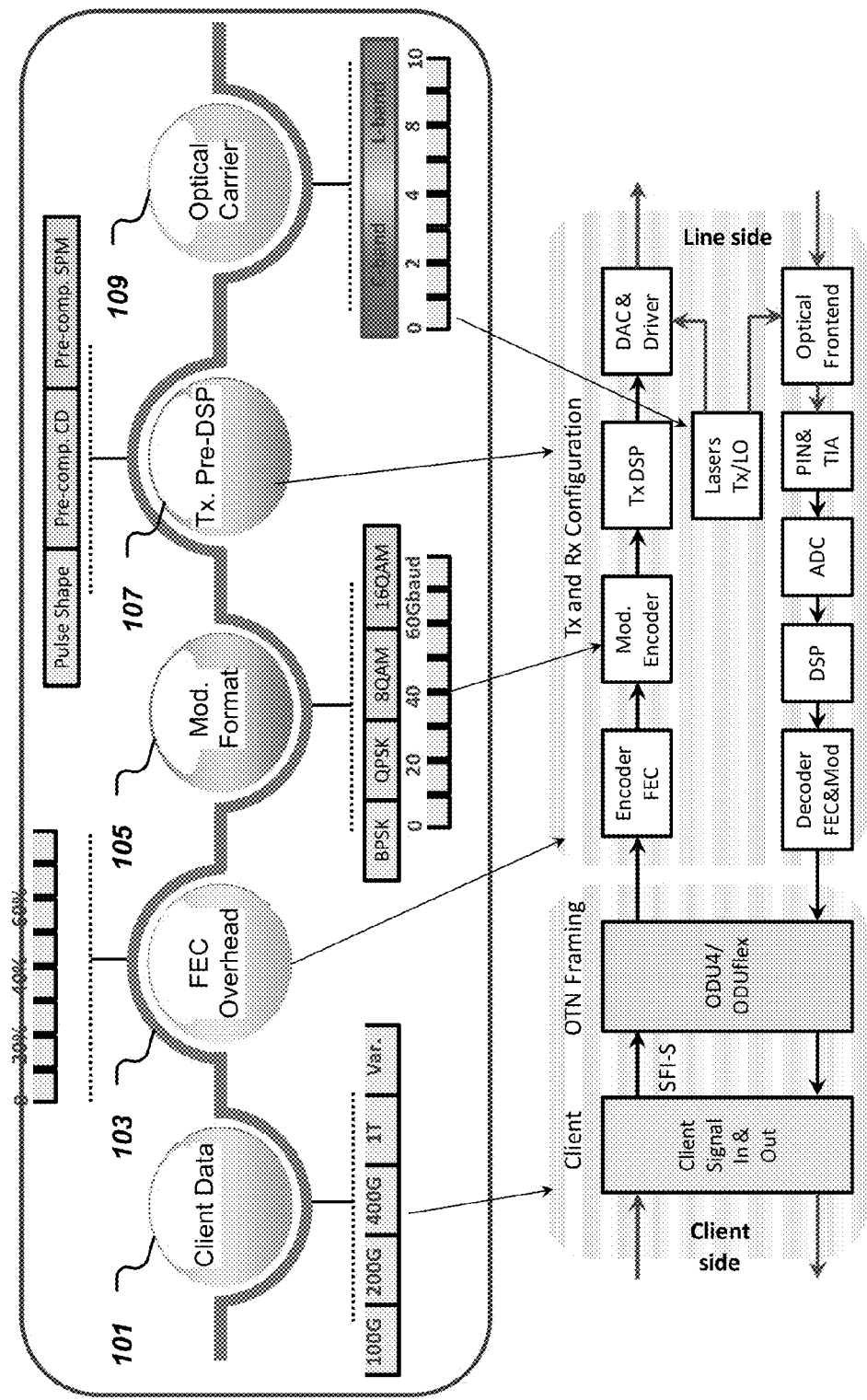
FIG. 1 depicts an example optical communication system in which software defined optics can be implemented.

FIG. 1 shows an illustration of an optical subsystem at the transmitter—side of an optical device (e.g., 102, 106) where physical parameters could be configured to achieve a desired performance while maximizing the network resource utilizations. Parameters 101 such as the throughput for the user data—10 G, 40 G, 100 G, 200 G, 400 G, 1 T, etc. may be used for configuration.

Another physical layer parameter 103 may define Forward error correction (FEC) coding overhead (e.g., 7, 15, 20, 25 percent) used for transmissions.

Another physical layer parameter 105 may define a modulation format used, e.g., binary phase shift keying (BPSK), quadrature PSK (QPSK), 16-quadrature amplitude modulation (16QAM), 64-QAM, in which symbol rate or data rate could be varied under different selections.

Another physical layer parameter 107 that can be defined pertains to the combination of both the transmitter and receiver side signal processing (e.g., pre-distortion filtering used) to optimize the transmission performance while simplifying the algorithm complexity, Another physical layer parameter 109 may define the number of optical carriers and the superchannel configuration that includes these optical carriers used for user data transmissions.

One technical challenge in some embodiments of such flexible systems is to have the receiver autonomously identify the channel parameter change and trigger the corresponding processing unit without any manual interruptions.

In wireless communications, automatic modulation classification may be accomplished with the use of signal feature based higher-order moments and cumulants. However, unlike wireless signals, such parameter recognition technologies are difficult in optical signals because of much higher data rate, specific fiber propagation impairments, and unique polarization coupling and polarization mode dispersion in polarization multiplexed systems. One solution may be to perform blind equalization the major impairments before using the signal feature to distinguish modulation formats or other parameters for optical signals. It may be difficult to find a completely blind and universal processing unit to process all different optical transmission parameters because most of physical parameters have their own optimized sets of algorithm to detect accurate information. As the number of constellation points increases in the modulation format used for signal transmission, the polarization demultiplexing and carrier recovery algorithms have to be redesigned to realize the best equalization effects. For example, the combined blind phase search (BPS) and maximum likelihood algorithms have been adopted for 16QAM and 64QAM signals instead of using simple Viterbi algorithm in QPSK (Quadrature phase shift keying) scheme. Meanwhile, it is not allowable for the response of switching application scenarios in optical systems and networks if all the signals have to be processed for the format-optimized algorithms and then make the decision for the physical parameters.

Furthermore, unlike wireless communications, optical signals can be polarization domain multiplexed. In optical receivers, the algorithm used for data recovery from modulation symbols may be sensitive to the algorithm of polarization demultiplexing and polarization mode dispersion compensation. For example, for QPSK signals, a receiver may use a constant modulus algorithm (CMA) to demultiplex the coupled signals while compensation on the residual chromatic dispersion and polarization mode dispersion. For receiving 16-QAM, the receiver may use a constant multimodulus algorithm (CMMA) because three rings exist in the constellation diagram, whereas for 32 QAM and 64QAM, yet another technique may be used, such as more rings in CMMA or decision-directed least mean square (DD-LMS) algorithm.

Figure 12:
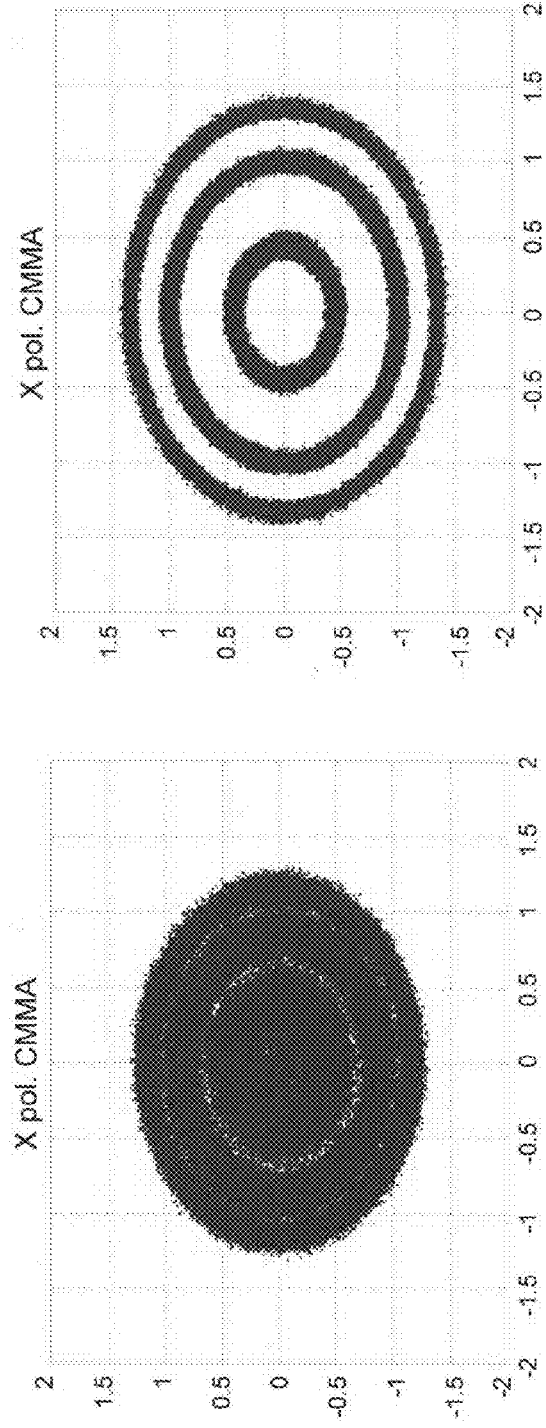
FIG. 12 shows examples of differences in demodulation performance using different optimization algorithms.

FIG. 12 shows example signal constellations illustrating the impact comparison of 16QAM signals when CMA (1202) and CMMA (1204) are used for polarization demultiplexing respectively. In this case, it will be highly possible to make a wrong decision on the modulation format when the system is based on CMA processing unit. Each of these receiver-side techniques may utilize different resources, e.g., a different software routine, or memory or logic blocks. Similarly, at the transmitter, for changing channel bandwidth, a different pre-distortion filter may have to be used. Thus, changes to the physical layer in an optical communication system may lend to a different set of timing and signal processing changes, both on the receiver side and on the transmitter side.

In some embodiments, the input data may be processed first with an impairment equalization technique, and clock and carrier recovery may be used to extract the physical parameters and then processing may be switched to a second processing unit for optimized demodulation signals. One downside with such embodiments is that the two cascade processing units can make the system very complicated, which is hard for commercialization. Further, this technique also needs the prior knowledge of format range and optical signal-to-noise ratio (OSNR). Furthermore, it may be problematic to extract the distinct information because of the absence of unified signal processing algorithms in the first section.

One example optical communication system in which the disclosed techniques are useful is depicted FIG. 1 below, which is a schematic illustration of an example Software Defined Optics (SDO) structure with various configured parameters.

In some embodiments, an optical transmitter may use a one-way (e.g., without any corresponding feedback from an optical receiver) in-band signaling frame to allow the receiver to automatically discover and identify the channel parameter changes, and trigger the configuration action to switch the corresponding optimal digital processing unit for the demodulating subsequent signal reception.

The in-band signaling frames can be an event-driven overhead that is used for insertion only when a physical layer parameter change is about to take place in the optical network. The signaling frames that include the actual information about the new transmission format that will be used after a switch is made are transmitted using the transmission format currently being used before the change. In this way, these frames can be processed and demodulated in optimal algorithm and inform the receiver end in advance of the change.

In one advantageous aspect, some embodiments can be implemented without using two processing units and can be transparent to the modulation formats and OSNR condition. The action decision can be made based on optimally processed signaling frames. Furthermore, more information such as all the parameters specified in SDO is possible to be carried in this in-band signaling frame.

Figure 2:
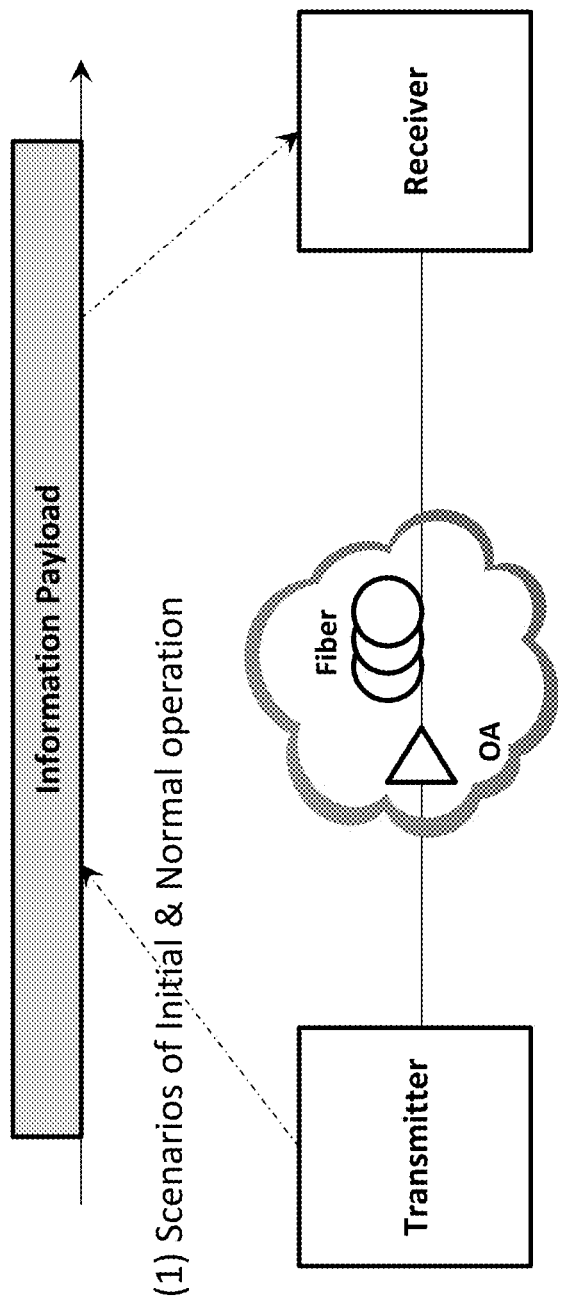
FIG. 2 depicts an example mechanism for a configuration process at the transmit and receive side in an optical communication network.

FIG. 2, depicts an example mechanism of configuration process at both a coherent optical transmitter and an optical receiver.

Figure 3:
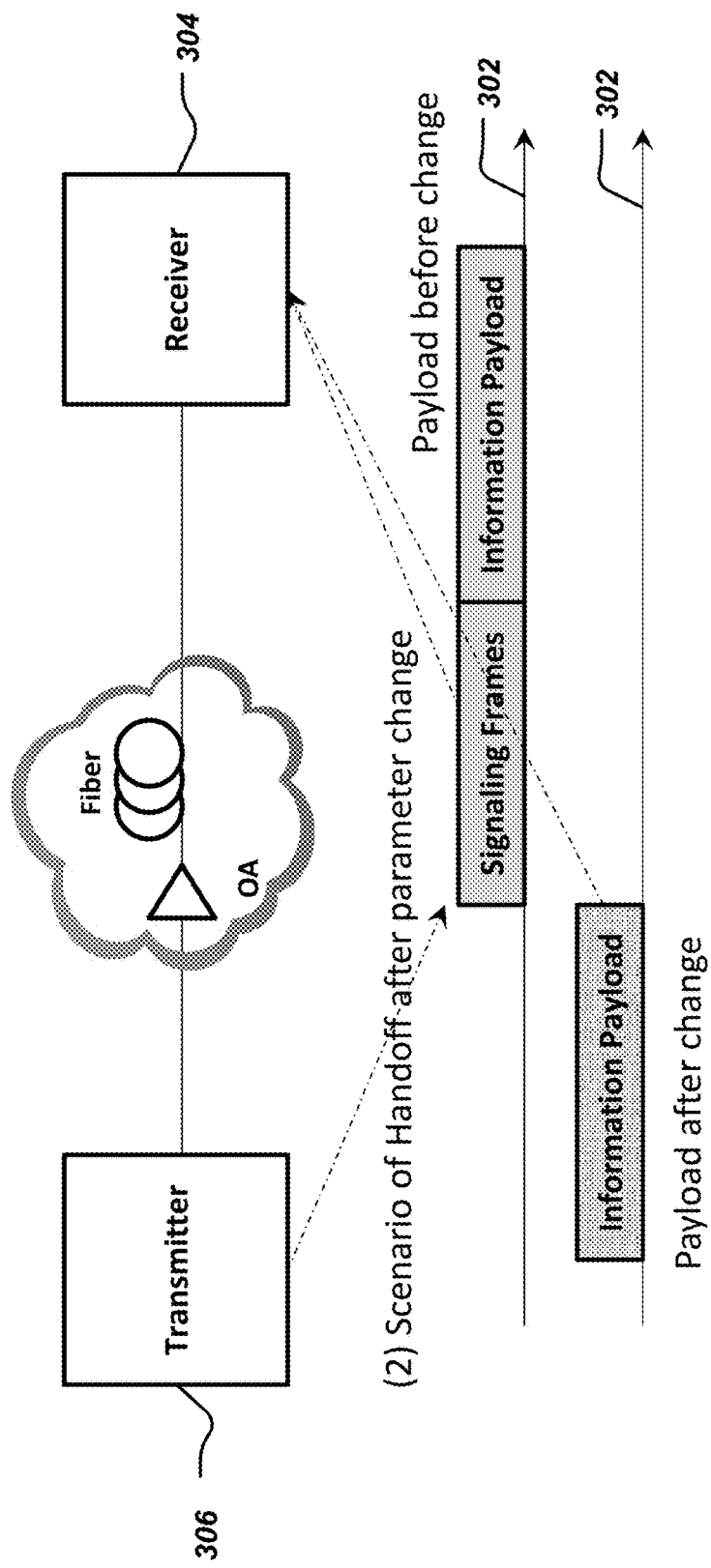
FIG. 3 depicts another example mechanism for a configuration process at the transmit and receive side in an optical communication network.

With reference to FIG. 2 and FIG. 3 some scenarios involved in the initial setup, normal operation, and handoff after physical parameter change are depicted. An optical transmitter (e.g., 102) is communicatively coupled to an optical receiver (e.g., 106) over an optical fiber optical communication medium, with signals optionally being amplified with an optical amplifier (OA).

In the initial setup scenario, a message for initial configuration of the transponder can be obtained from the management plane (e.g., operator specified or calculated by a management application based on the target throughput at the given time). A controller in transmitter then configures the content of the signaling frame. This procedure at transmitter is to memorize the parameter configurations of current operation. On the other hand, the controller at receiver may switch to the corresponding digital signal processing unit based on the same message from the management layer. During operation, when no further changes are to be made to the currently used transmission format, no overhead of a signaling frame is incurred. The transmitter may simply transmit information frames to the receiver carrying user data (e.g., application layer data) and possible control data. In other words, in some embodiments, no periodic overheads are sent out with physical layer profile information.

With reference to FIG. 3, depicting events along a time line 302, when a time for the parameter change is coming, this may be considered to be a physical layer "handoff" from one transmission format to another transmission format. The content of a signaling frame is changed by the transmitter 306 to the desired parameters that define the physical layer profile that will be used after the switch (or handoff) occurs, while keeping the current modulation unchanged. In some embodiments, the transmission of a regular information payload may be delayed and signaling frame(s) may be inserted carrying information about the upcoming transition.

At the receiver side, the receiver 304 is able to receive the signaling frame(s) and identify the content in the signaling frame after demodulation and make a change of the corresponding receiver processing unit to prepare the processing unit for the new modulation format that will soon be used by the transmitter. In this way, the optimal digital signal processing unit can be used to demodulate the frame information before the receiver make a handoff to next mode.

Figure 4:
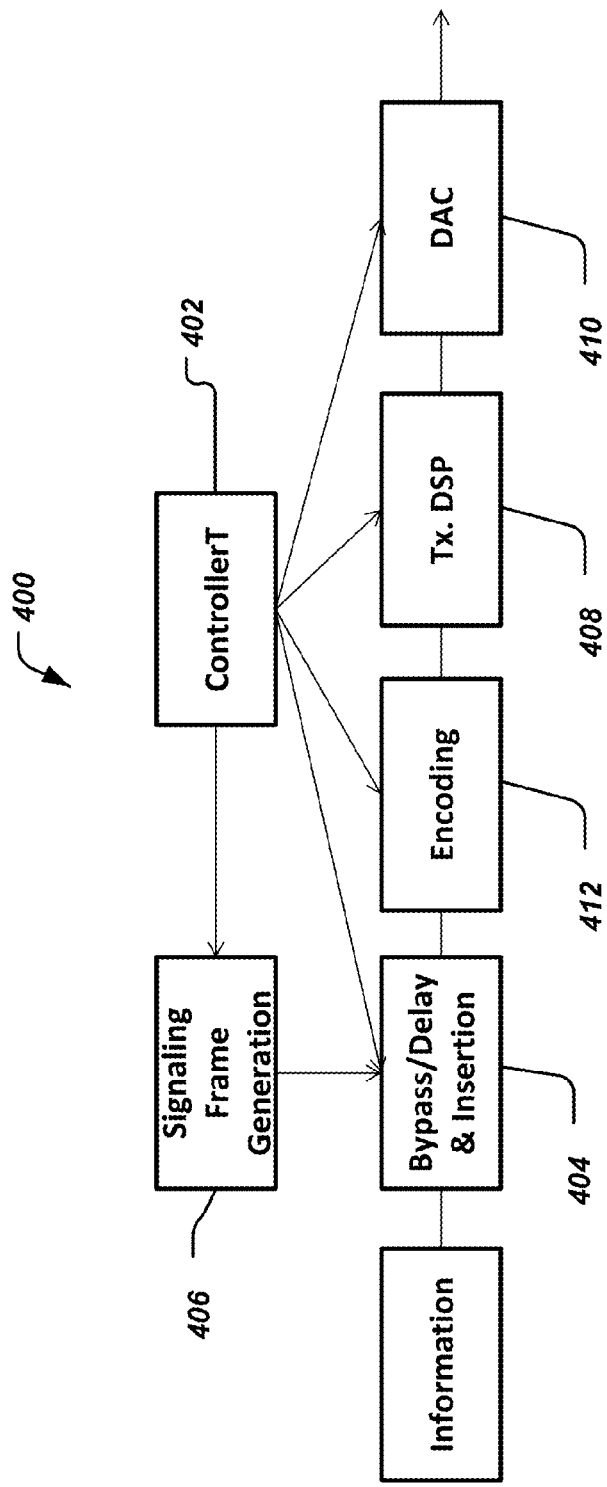
FIG. 4 depicts an example control structure at the transmitter side.

FIG. 4 depicts an example control structure 400 at the transmitter-side. An example transmitter configuration includes a ControllerT 402, a bypass/delay or insertion unit 404, and a signaling frame generation unit 406 as well as the conventional functional hardware with reconfigurable capability such as encoding, transmitter side DSP (digital signal processing) 408, and DAC (digital to analog conversion) 410 details. The controllerT 402 may receive the messages from management layer or future control center in a software-defined network environment. The signaling frame generation unit 406 creates the content of parameter change based on the request from ControllerT 402. In the initial and normal operation phase, the Bypass function 404 is on (i.e., information payloads are not delayed). While in the handoff phase, the Delay and Insertion 404 is activated to put the generated signaling frame into the encoding 412 for in-band transmission. After the transition is over, the ControllerT 402 can send the command to reconfigure the corresponding hardware units to Bypass operation 404. To have better performance that is robust to channel errors, the signaling frame can be inserted before the FEC encoding process 412.

Figure 5:
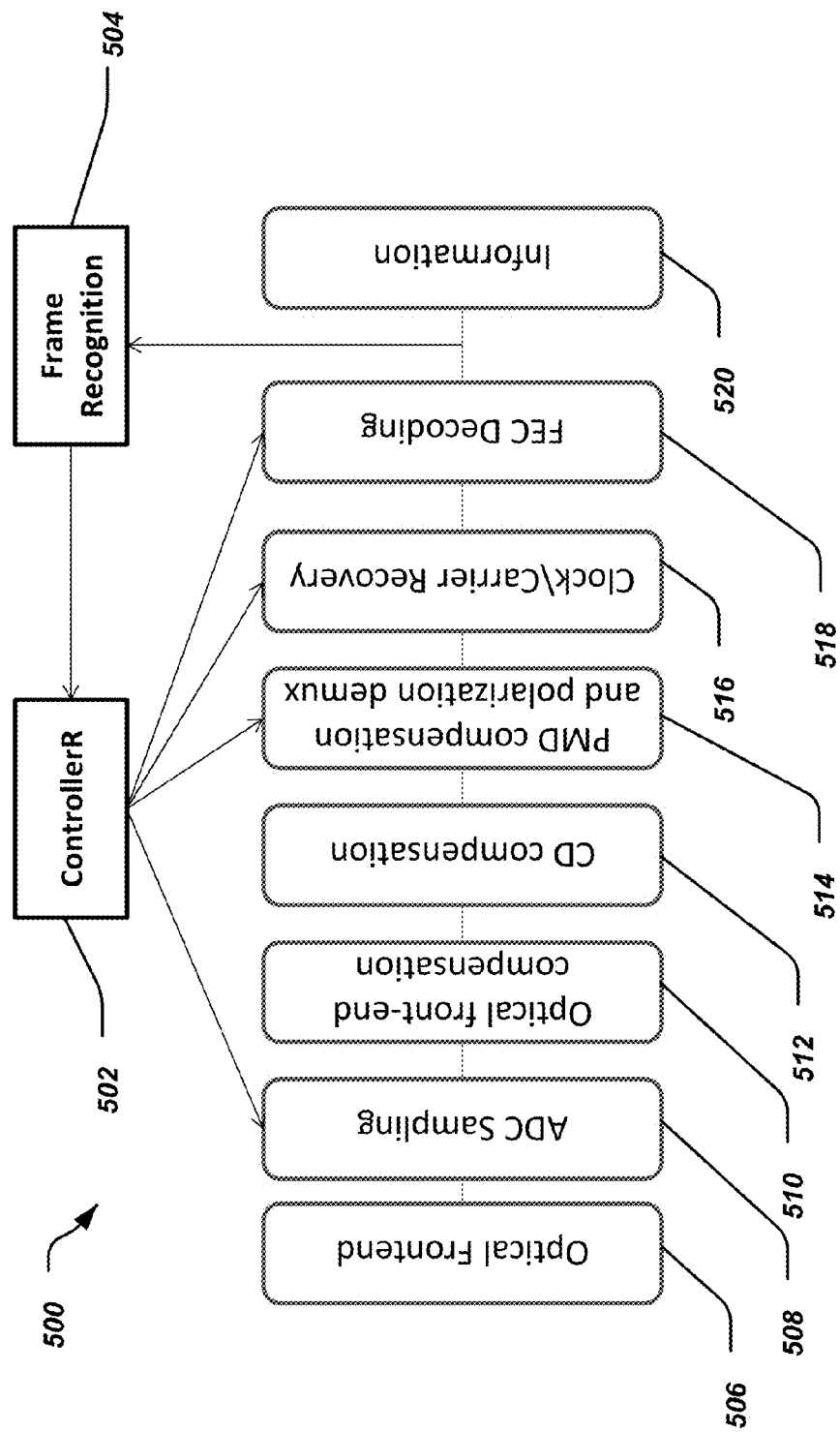
FIG. 5 depicts an example control structure at the receiver side.

FIG. 5 depicts an example control structure 500 at an optical receiver side. At the receiver side, a Frame Recognition unit 504 performs the identification function from the decoded information stream. When it finds the matched frame information from the database of physical layer transmission format parameters, it can send the parameter change information to the ControllerR 502. The ControllerR 502 can take the action to the corresponding digital signal processing unit to switch to their desired optimal mode, including ADC 508 sampling rate, PMD compensation and polarization demultiplexing 510, 512, 514, clock and carrier recovery 516, and FEC decoding 518, as suitable. The information 520 after FEC decoding 518 is used as input for the Frame Recognition unit 504, which takes advantage of FEC correction capability. The recognition can be based on recovered bit level and simple comparator can be used for recognition. An optical frontend 506 may be used to receive optical signal, followed by analog to digital (ADC) sampling 508 to produce digital data that can be input to the optical front-end compensation unit 510.

Figure 6:
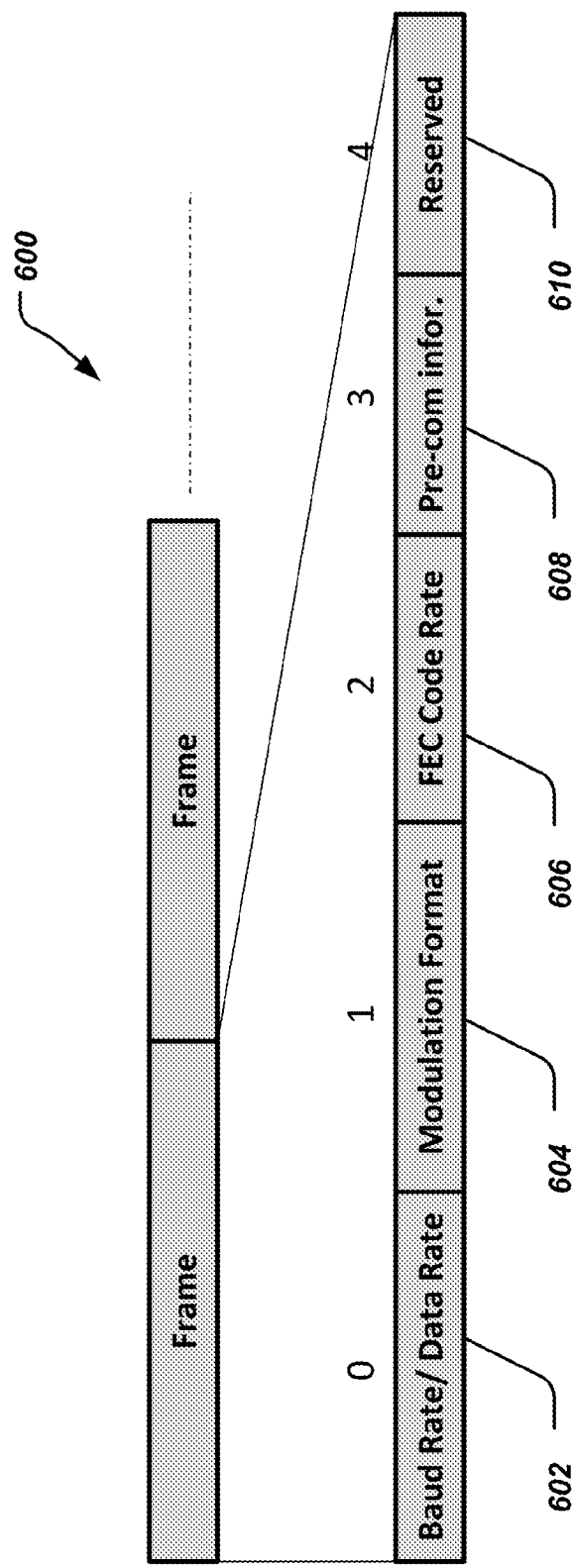
FIG. 6 depicts an example information frame structure.

FIG. 6, depicts an example Signaling frame structure listing example definitions and encoding for SDO information for in-band signaling. The information includes one or more of baud rate/data rate (602), modulation format (604), FEC coding rate (606), amount of pre-compensation for channel distortion (CD) or nonlinearity or pulse shaping factor (608), and an optional reserved field 610 for other optical impairment related information. In some embodiments, only parameters being changed may be transmitted in the signaling frame, with the understanding that the other physical layer parameters will remain same after the transition.

Two example rules that may be used for selecting the length and encoding of this structure may be as follows. One is that the encoding information should not be confused with regular information. This may be accomplished using special fields, signature bits, etc. The second rule is that enough time should be allocated for taking actions for change both in transmitter and receiver. Cascade multiple same Frames can be one of the options to reduce the confusion probability and leave enough time duration for a receiver to prepare its processing units for the upcoming physical layer changes.

Figure 7:
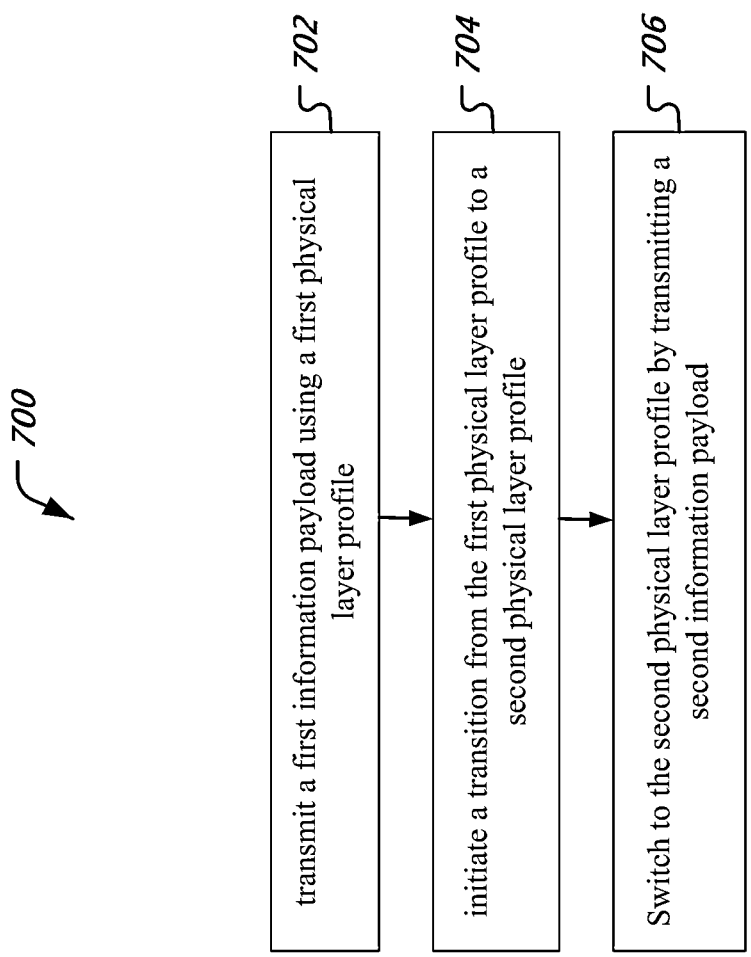
FIG. 7 shows an example flow chart representation of a process implemented at an optical transmitter.

FIG. 7 is a flowchart depiction of an example process 700 implementable at an optical transmitter (e.g., 102, 106).

At 702, the process 700 includes transmitting a first information payload using a first physical layer profile. The first information payload may carry application layer user data. A physical layer profile may be characterized by several parameters, e.g., modulation format, error correction code etc., as discussed herein.

At 704, the process 700 includes initiating, at least a transition time prior to a switch time, a transition from the first physical layer profile to a second physical layer profile. The transition time is sufficient to allow changing of an optical polarization demultiplexing scheme at a receiver side. As previously disclosed, optical receivers may use different signal processing units for different polarization modulations. A transmitter may have a priori knowledge of a preparation time that a receiver may want to switch from one physical layer profile to another. For example, for 100 Gbits throughput physical layer throughput systems (which may result in about 60 Gbps user data throughput), a 2 millisecond transition time may be used. Thus, in such a system, the transition to using the second physical layer profile for signal transmissions may be initiated 2 milliseconds prior to the actual change in the transmitted signal. The initiation may include, e.g., re-configuring certain circuits, e.g., gain circuitry, constellation mapping circuitry, etc.

At 706, the process 700 switches, after the switch time, to the second physical layer profile by transmitting a second information payload using the second physical layer profile. The optical receiver may notice the switch at the immediate next transmission from the optical transmitter.

In some embodiments, the process 700 may receive a network operation rule and may determine the switch time based on the network operation rule. For example, as disclosed herein, a network operation rule may simply be a command from an upper layer management application. In some embodiment, the network operation rule may specify a schedule of target bitrates. For example, the throughput and channel arrangement of an optical communication network may be changed depending on the time of day, the day of the week, and so on. For example, on weekend evenings, when many people are streaming video using services such as Netflix, optical communication may use several smaller bandwidth channels that can carry unicast data for users. Alternatively, during the time there is more traffic demand at the core of the network (e.g., broadcast studios transferring video), a modulation scheme that uses larger bandwidth channels and higher constellations, may be used.

Figure 8:
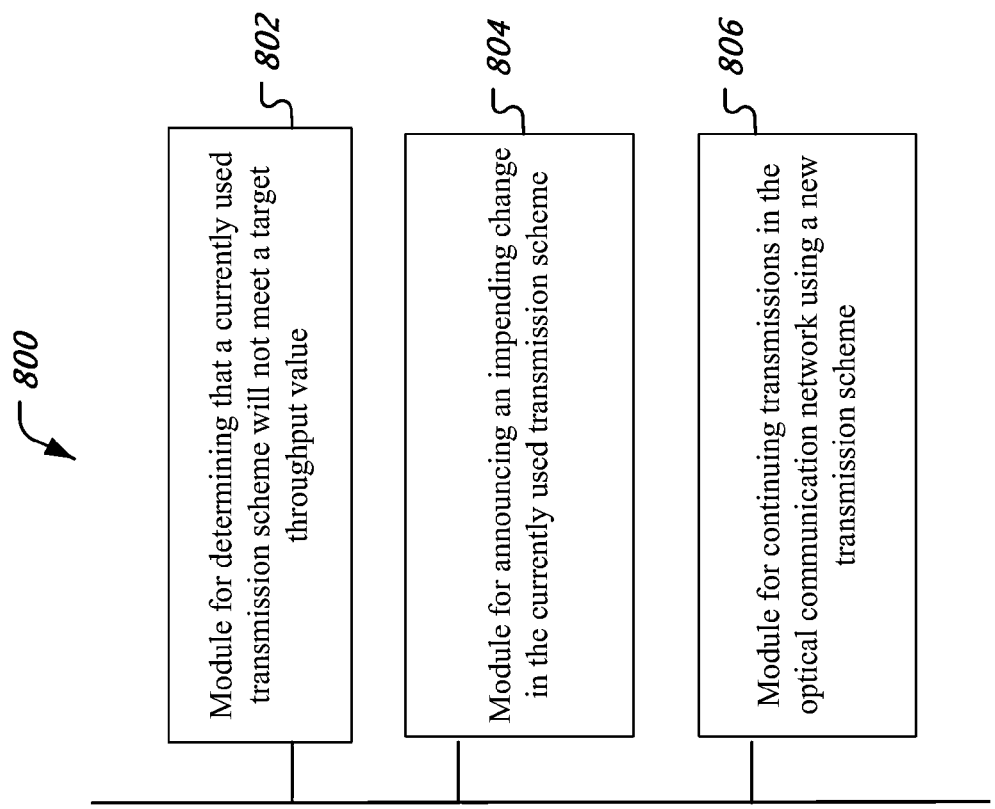
FIG. 8 shows an example block diagram representation of an optical transmission apparatus.

FIG. 8 is a block diagram representation of an example optical transmission apparatus 800. The module 802 (e.g., a determination module) determines, at a current time, that a currently used transmission scheme will not meet a target throughput value for the optical communication network at a future time. The module 804 (e.g., an announcement module) announces a change in an impending change in the currently used transmission scheme in a message sent over the communication network using the currently used transmission scheme, wherein the change is announced at a time sufficiently prior to the future time to allow a change to an optical polarization demultiplexing scheme at a receiver side. The module 806 (e.g., a transmission module) continues, after the future time, transmissions in the optical communication network using a new transmission scheme that is different from the currently used transmission scheme.

Figure 9:
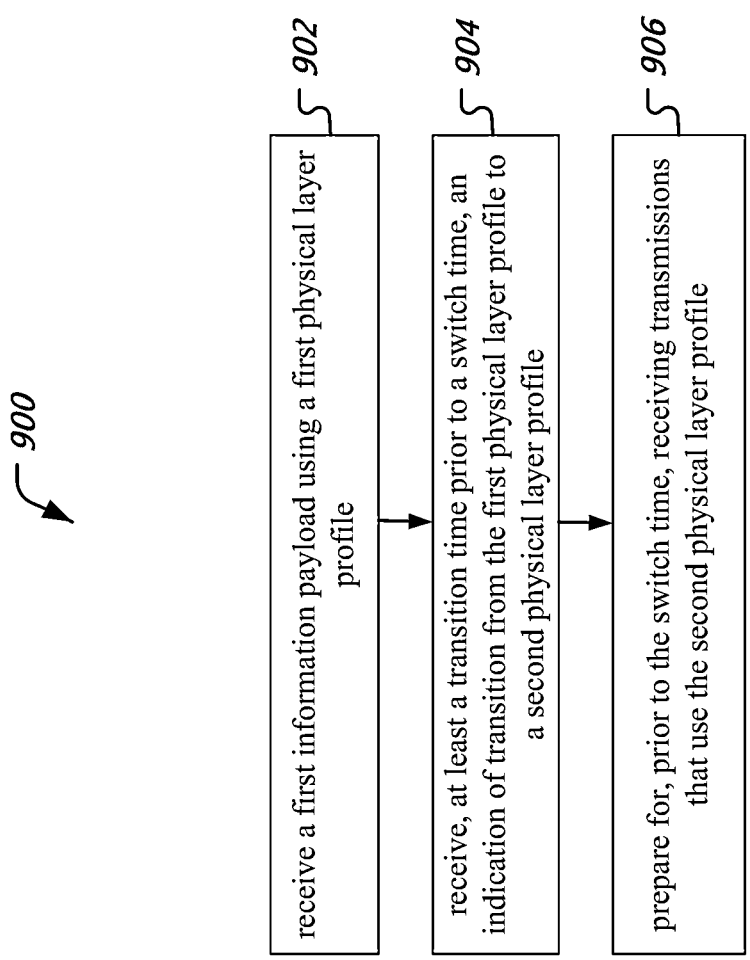
FIG. 9 shows an example flow chart of a process implemented at an optical receiver.

FIG. 9 is a flowchart representation of a process 900 implementable at an optical receiver.

At 902, the process 900 receives a first information payload using a first physical layer profile. The optical receiver, with the knowledge of what the first physical layer profile is, may have pre-configured its receiving mechanism to receive signals that are modulated using parameters as specified in the first physical layer profile and recover information carried in the signal.

At 904, the process 900 receives, at least a transition time prior to a switch time, an indication of transition from the first physical layer profile to a second physical layer profile. The transition may indicate to the process 900 that the transmitting side is about to change from using signal transmission parameters as specified by the first physical layer profile to using signal transmission parameters as specified by the second physical layer profile. The indication may be in the form of an in-band signaling message, as previously disclosed. Unlike wireless communications, the indication is carried over the same physical channel using the same transmission format as is used for application layer user data transmission.

At 906, the process 900 prepares for, prior to the switch time, receiving transmissions that use the second physical layer profile. The preparation may include configuring digital signal processing units, as previously described. The optical receiver may not send any channel quality feedback or any acknowledge indicating its readiness for receiving information data with the new physical layer parameters.

Figure 10:
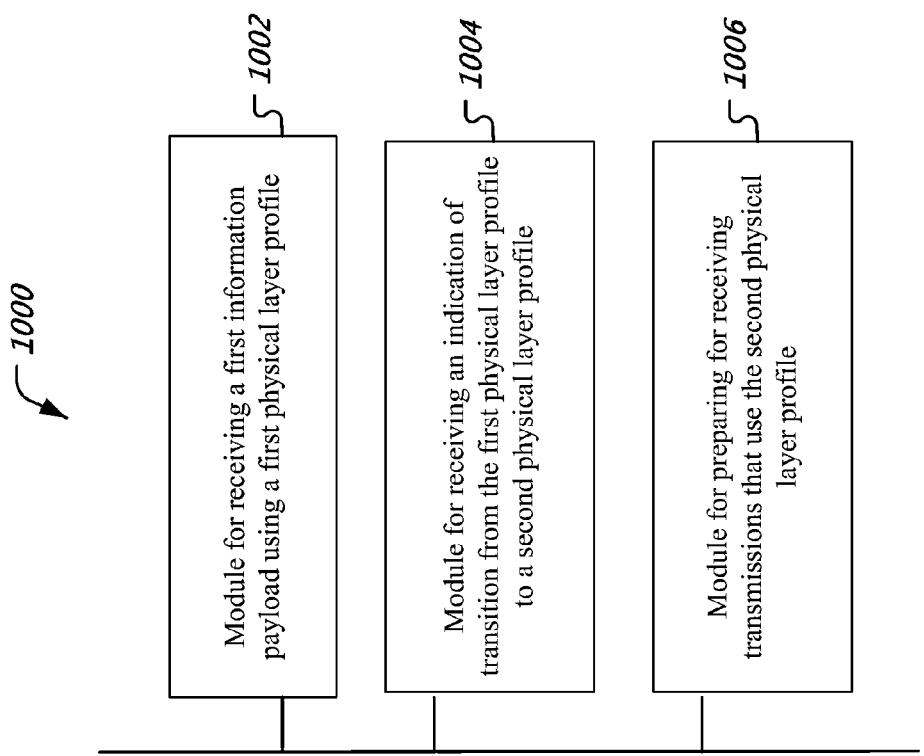
FIG. 10 shows an example block diagram representation of an optical receiver apparatus.

FIG. 10 is a block diagram representation of an optical receiver apparatus 1000. The module 1002 is for receiving a first information payload using a first physical layer profile. The module 1004 is for receiving, at least a transition time prior to a switch time, an indication of transition from the first physical layer profile to a second physical layer profile. The module 1006 is for preparing for, prior to the switch time, receiving transmissions that use the second physical layer profile.

It will be appreciated that techniques for seamlessly changing physical layer operation of an optical communication network, without causing even a temporary loss of communication between a transmitter and a receiver, are disclosed. In one aspect, the disclosed techniques may be used to maintain a target system throughput at all times, regardless of a time variation in the target throughput.

It will further be appreciated that the disclosed technique distinguish over wireless communications techniques in which the wireless throughput changes over time due to time-varying nature of wireless channels, at least because unlike wireless communications, optical communication uses polarization division multiplexing. Furthermore, unlike wireless communications, in the disclosed techniques, signal messaging that communicates information about changes to physical layer are communicated in-band, i.e., using the same transmission format as the application layer information payload. Furthermore, unlike wireless communications, where a receiver provides quality feedback to a transmitter for adapting modulation, in some disclosed embodiments, the changes to the transmission format may be performed without any feedback from the receiver and without depending on changes to the transmission medium, but simply to meet operator-specified target throughputs and expedite the response time in the lowest physical layer.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method implemented by an optical transmitter operable in an optical communication network, comprising:
    transmitting a first portion of an information payload using a first physical layer profile, wherein the information payload includes the first portion and a second portion;
    delaying a transmission of the second portion of the information payload by inserting, at a transition time prior to a switch time, a signal frame that includes a second physical layer profile to a receiver side, wherein the signal frame is transmitted using the first physical layer profile, and wherein the signal frame is inserted before performing an error encoding process and the transmitter has a priori knowledge that the transition time is sufficient to allow changing of an optical polarization demultiplexing scheme at the receiver side; and
    transmitting, at the switch time, the second portion of the information payload to the receiver end using the second physical layer profile included in the signal frame.

2. The method of claim 1, further comprising:
    receiving a network operation rule; and
    determining the switch time based on the network operation rule.

3. The method of claim 2, wherein the network operation rule comprises a target optical throughput in the optical communication network as a function of time, and wherein first physical layer profile, the switch time and the second physical layer profile are selected to meet the target optical throughput in the optical communication network.

4. The method of claim 1, wherein the first physical layer profile and the second physical layer profile each include one or more information fields from a corresponding forward error correction information, a modulation format information, a pre-distortion filter information and an optical carrier information and wherein the first physical layer profile and the second physical layer profile have a different value for at least one of the information fields.

5. The method of claim 1, wherein the transmitting of the second portion of the information payload is performed without receiving an acknowledgement message indicative of readiness of the receiver side for the switching to the second physical layer profile.

6. An optical transmitter apparatus operable in an optical communication network, comprising:
a processor that determines, at a current time, that a currently used transmission scheme will not meet a target throughput value for the optical communication network at a future time, the processor delays a current transmission by inserting a message over the communication network using the currently used transmission scheme to announce a change from the currently used transmission scheme to a new transmission scheme, wherein the message includes an optical polarization demultiplexing scheme to be used at a receiver side, wherein the message is inserted before an error encoding process and at a transmission time sufficiently prior to the future time to allow a change to the optical polarization demultiplexing scheme included in the message at the receiver side, and wherein the processor has a priori knowledge that the transmission time is sufficient to allow changing of the optical polarization demultiplexing scheme at the receiver side; and
a transmission module that continues, after the future time, the current transmission in the optical communication network using the new transmission scheme that is different from the currently used transmission scheme.

7. The apparatus of claim 6,
wherein the processor receives a network operation rule and calculates the target throughput value for the future time based on the network operation rule.

8. The apparatus of claim 6, wherein the transmission scheme comprises one or more of a forward error correction information, a modulation format information, a pre-distortion filter information and an optical carrier information.

9. The apparatus of claim 6, wherein the processor further transmits a description of the new transmission scheme.

10. The apparatus of claim 6, wherein the transmission module begins to use the new transmission scheme without receiving an acknowledgement message indicative of readiness of a receiver side for receiving the new transmission scheme.

11. A method implemented by an optical receiver operable in an optical communication network, comprising:
receiving a first portion of an information payload using a first physical layer profile;
receiving, prior to receiving a second portion of the information payload, a signal frame using the first physical layer profile, the signal frame including a second physical layer profile indicative of a transition from the first physical layer profile to the second physical layer profile, wherein the signal frame is received at a transition time prior to a switch time, the transition time being sufficient to allow changing of an optical polarization demultiplexing scheme at the optical receiver, and wherein the signal frame is processed after performing an error decoding process to obtain parameters for the second physical layer profile; and
preparing for, prior to the switch time, receiving the second portion of the information payload using the second physical layer profile by switching at least one digital processing unit to the second physical layer profile based on the parameters for the second physical layer profile.

12. The method of claim 11, wherein the first physical layer profile and the second physical layer profile each include one or more information fields from a corresponding forward error correction information, a modulation format information, a pre-distortion filter information and an optical carrier information and wherein the first physical layer profile and the second physical layer profile have a different value for at least one of the information fields.

13. The method of claim 11, further comprising:
refraining from sending an acknowledgement to the signal frame.

14. An optical receiver apparatus operable in an optical communication network, comprising:
a processor that receives a first portion of an information payload using a first physical layer profile, the processor receives, prior to receiving a second portion of the information payload, a signal frame using the first physical layer profile, the signal frame including a second physical layer profile indicative of a transition from the first physical layer profile to the second physical layer profile, wherein the signal frame is received at a transition time prior to a switch time, the transition time being sufficient to allow changing of an optical polarization demultiplexing scheme at the optical receiver, wherein the processor processes the signal frame after an error decoding process to obtain parameters for the second physical layer profile and the processor, using the parameters for the second physical layer profile, further prepares for, prior to the switch time, receiving transmissions that use the second physical layer profile.

15. The apparatus of claim 14, wherein the first physical layer profile and the second physical layer profile each include one or more information fields from a corresponding forward error correction information, a modulation format information, a pre-distortion filter information and an optical carrier information and wherein the first physical layer profile and the second physical layer profile have a different value for at least one of the information fields.

16. An optical communication system comprising an optical transmitter and an optical receiver communicatively coupled over an optical transmission medium,
wherein the optical transmitter is configured to:
transmit a first portion of an information payload using a first physical layer profile, wherein the information payload includes the first portion and a second portion;
delay a transmission of the second portion by inserting, at a transition time prior to a switch time, a signal frame that includes the second physical layer profile to the optical receiver, wherein the signal frame is transmitted using the first physical layer profile, and wherein the signal frame is inserted before performing an error encoding process and the transmitter has a priori knowledge that the transition time is sufficient to allow changing of an optical polarization demultiplexing scheme at the optical receiver; and
transmit, at the switch time, the second portion of the information payload to the optical receiver using the second physical layer profile included in the signal frame; and
wherein the optical receiver is configured to:
receive the first portion of the information payload using the first physical layer profile;
receive, prior to receiving the second portion of the information payload, the signal frame using the first physical layer profile, the signal frame including the second physical layer profile indicative of a transition from the first physical layer profile to the second physical layer profile, wherein the signal frame is processed after performing an error decoding process to obtain parameters for the second physical layer profile; and prepare for, prior to the switch time, receiving the second portion of the information payload using the second physical layer profile based on the parameters.

17. The optical communication system of claim 16, wherein the switch time is based on a network operation rule.

18. The method of claim 1, wherein the signal frame is inserted multiple times to facilitate the receiver side to prepare for switching to the second physical layer profile.

19. The apparatus of claim 6, wherein the signal frame is inserted multiple times to facilitate the receiver side to prepare for switching to the second physical layer profile.

* * * * *